US010352691B1

United States Patent
Chen et al.

(10) Patent No.: US 10,352,691 B1
(45) Date of Patent: Jul. 16, 2019

(54) SYSTEMS AND METHODS FOR WAFER STRUCTURE UNIFORMITY MONITORING USING INTERFEROMETRY WAFER GEOMETRY TOOL

(71) Applicant: KLA-Tencor Corporation, Milpitas, CA (US)

(72) Inventors: Haiguang Chen, Mountain View, CA (US); Jaydeep Sinha, Livermore, CA (US); Shouhong Tang, Santa Clara, CA (US); Sergey Kamensky, Campbell, CA (US)

(73) Assignee: KLA-Tencor Corporation, Milpitas, CA (US)

(*) Notice: Subject to any disclaimer, the term of this patent is extended or adjusted under 35 U.S.C. 154(b) by 849 days.

(21) Appl. No.: 14/325,758

(22) Filed: Jul. 8, 2014

Related U.S. Application Data (60) Provisional application No. 61/981,596, filed on Apr. 18, 2014.

(51) Int. Cl.
*G01B 11/24* (2006.01)
*G01B 9/02* (2006.01)

(52) U.S. Cl.
CPC ...... *G01B 11/2441* (2013.01); *G01B 9/02083* (2013.01)

(58) Field of Classification Search
CPC .................. G01B 11/2441; G01B 9/02083
USPC ................ 702/21, 22, 27, 90, 122; 257/466; 356/512
See application file for complete search history.

(56) References Cited

U.S. PATENT DOCUMENTS

| | | | | | |
|---|---|---|---|---|---|
| 5,204,734 | A * | 4/1993 | Cohen | ............... | G01B 11/2441 250/559.22 |
| 6,061,606 | A * | 5/2000 | Ross | ................. | G03F 7/70633 257/466 |
| 7,990,543 | B1 * | 8/2011 | Mello | ............... | G01B 11/2441 356/512 |
| 2005/0057756 | A1 * | 3/2005 | Fang-Yen | .............. | G01N 21/45 356/497 |
| 2005/0105097 | A1 * | 5/2005 | Fang-Yen | .......... | G01B 9/02072 356/497 |
| 2007/0110334 | A1 * | 5/2007 | Takahashi | .......... | G01B 11/2441 382/276 |
| 2010/0094135 | A1 * | 4/2010 | Fang-Yen | .......... | G01B 9/02072 600/476 |
| 2013/0265585 | A1 * | 10/2013 | Fang-Yen | .......... | G01B 9/02072 356/497 |

OTHER PUBLICATIONS

U.S. Appl. No. 14/246,895, Apr. 7, 2014, Haiguang Chen et al.

* cited by examiner

*Primary Examiner* — Stephanie E Bloss
*Assistant Examiner* — Lisa E Peters
(74) *Attorney, Agent, or Firm* — Suiter Swantz pc llo (57) ABSTRACT

Systems and methods for processing phase maps acquired using interferometer wafer geometry tools are disclosed. More specifically, instead of performing phase unwrapping first and then analyze the unwrapped data in a height domain, systems and methods in accordance with the present disclosure operate in a curvature domain without having to perform any phase unwrapping.

22 Claims, 7 Drawing Sheets

SYSTEMS AND METHODS FOR WAFER STRUCTURE UNIFORMITY MONITORING USING INTERFEROMETRY WAFER GEOMETRY TOOL

CROSS-REFERENCE TO RELATED APPLICATIONS

The present application claims the benefit under 35 U.S.C. § 119(e) of U.S. Provisional Application Ser. No. 61/981,596, filed Apr. 18, 2014. Said U.S. Provisional Application Ser. No. 61/981,596 is hereby incorporated by reference in its entirety.

TECHNICAL FIELD

The disclosure generally relates to the field of wafers, and particularly to systems and methods for wafer structure uniformity monitoring.

BACKGROUND

Thin polished plates such as silicon wafers and the like are a very important part of modern technology. A wafer, for instance, may refer to a thin slice of semiconductor material used in the fabrication of integrated circuits and other devices. Other examples of thin polished plates may include magnetic disc substrates, gauge blocks and the like. While the technique described here refers mainly to wafers, it is to be understood that the technique also is applicable to other types of polished plates as well. The term wafer and the term thin polished plate may be used interchangeably in the present disclosure.

Fabricating semiconductor devices typically includes processing a semiconductor wafer using a number of semiconductor fabrication processes. For example, a wafer can have a top layer polished or a top layer just formed from certain chip production processes. A semiconductor fabrication process known as lithography may then transfer a pattern from a reticle to a resist arranged on the semiconductor wafer. Additional examples of semiconductor fabrication processes include, but are not limited to, chemical-mechanical polishing (CMP), etching, deposition, and ion implantation. Multiple semiconductor devices may be fabricated in an arrangement on a single semiconductor wafer and then separated into individual semiconductor devices.

Generally, certain requirements may be established for the flatness and thickness uniformity of the wafers. There exist a variety of techniques to address the measurement of shape and thickness variation of wafers. However, most existing wafer measurement tools are designed for bare wafer geometry measurements. Their abilities to provide useful pattern structure information of patterned wafers are limited.

SUMMARY

The present disclosure is directed to a method. The method includes: acquiring a plurality of intensity frames of a surface of a wafer; extracting a phase map of the surface of the wafer based on the plurality of intensity frames; calculating a phase slope map in a selected direction of the phase map of the surface of the wafer; calculating a phase curvature map in the selected direction of the phase map of the surface of the wafer, the phase curvature map representing slope of the phase slope map; and obtaining pattern structure information present on the surface of the wafer based on the phase curvature map.

A further embodiment of the present disclosure is also directed to a method. The method includes: acquiring a plurality of intensity frames of a surface of a wafer; extracting a phase map of the surface of the wafer based on the plurality of intensity frames; calculating a phase slope map in a selected direction of the phase map of the surface of the wafer; calculating a phase curvature map in the selected direction of the phase map of the surface of the wafer, the phase curvature map representing slope of the phase slope map; obtaining pattern structure information present on the surface of the wafer based on the phase curvature map; calculating pattern structure height information based on the phase curvature map; and monitoring pattern structure uniformity based on the pattern structure height information.

An additional embodiment of the present disclosure is directed to a method. The method includes: acquiring a plurality of intensity frames of a surface of a wafer; extracting a phase map of the surface of the wafer based on the plurality of intensity frames; calculating a phase slope map in a selected direction of the phase map of the surface of the wafer; calculating a phase curvature map in the selected direction of the phase map of the surface of the wafer, the phase curvature map representing slope of the phase slope map; obtaining pattern structure information present on the surface of the wafer based on the phase curvature map; filtering the pattern structure information from the phase curvature map; and calculating a pseudo-bare wafer surface based on the filtered phase curvature map.

An additional embodiment of the present disclosure is directed to a system. The system includes an interferometer configured for acquiring a plurality of intensity frames of a surface of a wafer. The system also includes a processor in communication with the interferometer. The processor is configured to: extract a phase map of the surface of the wafer based on the plurality of intensity frames; calculate a phase slope map in a selected direction of the phase map of the surface of the wafer; calculate a phase curvature map in the selected direction of the phase map of the surface of the wafer, the phase curvature map representing slope of the phase slope map; and obtain pattern structure information present on the surface of the wafer based on the phase curvature map.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Silicon wafers are available in a variety of sizes. They may also be patterned or presented as bare wafers. Interferometer wafer metrology systems, such as WaferSight metrology system from KLA-Tencor, may scan both the front and back surfaces of a wafer at the same time. By combining wafer shape, edge roll-off, thickness or flatness, and topography measurements in a single scan, such wafer metrology tools may provide complete data sets that are necessary for topography and wafer geometry monitoring in wafer manufacturing.

It is noted, however, that most existing interferometer wafer metrology systems reconstruct the wafer surface by calculating the wrapped surface phase maps from a sequence of measured interferometry image frames and then unwrapping these phase maps for the wafer surface height maps. It is noted that the general two dimensional phase unwrapping for wafer surface height maps may introduce errors and failures have been observed when height maps are used to monitor patterned wafer structure uniformities.

In patterned wafer geometry, the patterns and films on the patterned wafer surfaces introduce larger wafer surface slopes and larger local shape changes, and these pattern and film structure changes can result in fast phase changes and severe phase unwrapping errors. These errors affect accurate measurements of wafer surface geometry and limit the use of wafer metrology tools in pattern wafer structure uniformity monitoring and many other applications.

Figure 1:
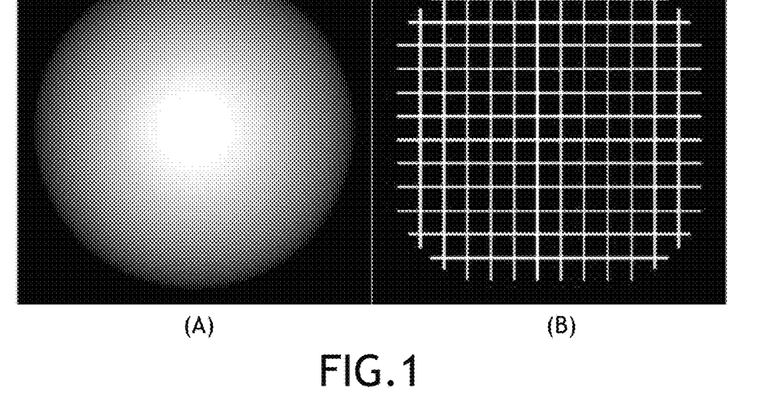
FIG. 1 is an illustration depicting a wafer surface shape map and a pattern component map which form a patterned wafer.
Figure 2:
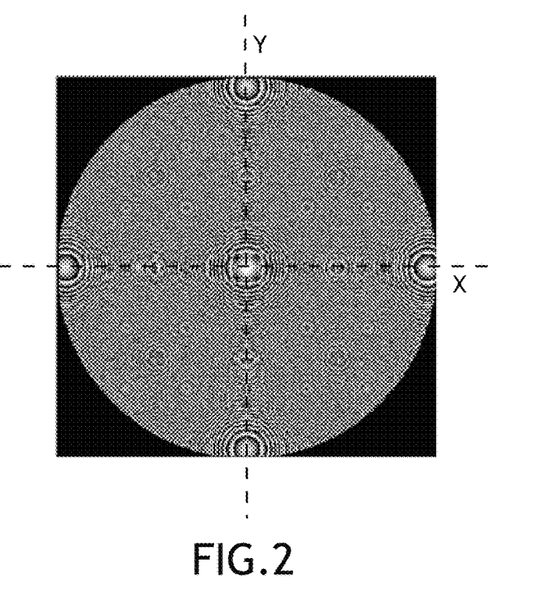
FIG. 2 is an illustration depicting an acquired phase map of a wafer surface using an interferometer wafer geometry tool.

FIG. 1 is an illustration depicting a wafer surface shape map (a) and a pattern component map (b) which form a patterned wafer. For illustrative purposes, suppose that the wafer shape has a bow value of about 50 um and the pattern components have a height of about 100 nm. The acquired phase map from this wafer surface using an interferometer wafer geometry tool (e.g., WaferSight) is shown in FIG. 2.

Figure 3:
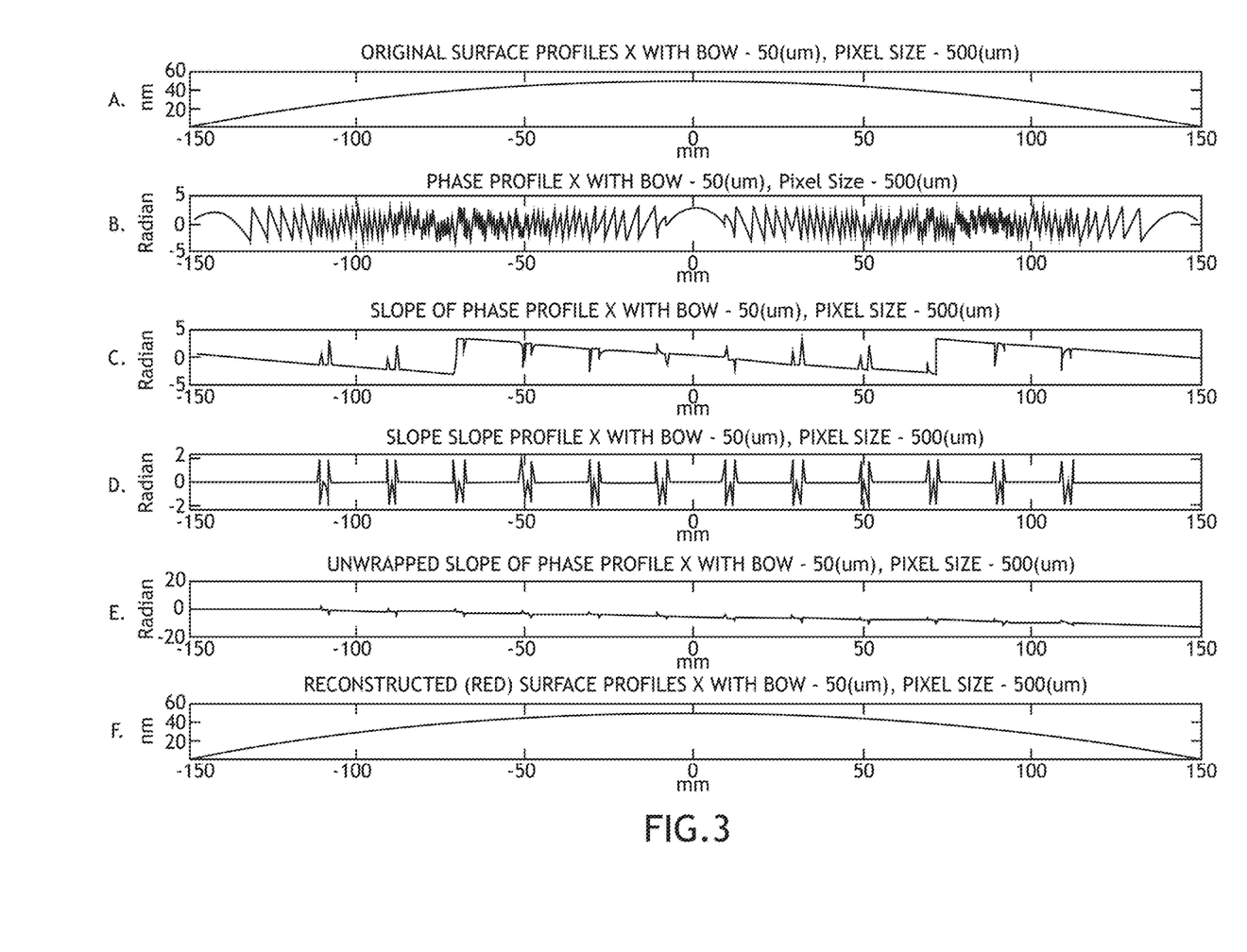
FIG. 3 is an illustration depicting relationships between a wafer surface profile, a phase profile, a phase slope, a phase curvature, a phase slope obtained from a phase curvature, and a reconstructed wafer surface profile.

For illustrative purposes, an exemplary surface profile on the x-axis and the corresponding phase profile are shown in FIG. 3. More specifically, FIG. 3A depicts the original surface profile on the x-axis and FIG. 3B depicts the acquired phase profile on this axis. Using this phase profile, a phase slope can be calculated as shown in FIG. 3C. Two problems exist in this phase slope due to the large wafer shape variation. First, there are two phase slope jumps larger than it across the wafer surface. Secondly, areas in the phase slope that corresponds to the pattern components have different magnitudes even though the original pattern components have uniform pattern height values. It is noted that problems as such will severely affect measurement accuracy and limit the use of interferometer metrology tools in patterned wafer applications.

Problems such as large phase slope jumps and non-uniform pattern component magnitudes described above may be mitigated by using higher sampling density on the acquired wafer intensity frames. For example, when a higher resolution imaging device is used for the same wafer surface, the phase map calculated may provide improved accuracy. However, this accuracy improvement is achieved at the expense of increased hardware cost and processing power. Furthermore, interferometer tools already in use would require hardware changes (e.g., upgraded imaging devices), which would be cumbersome and may not be feasible in certain cases.

The present disclosure is directed to systems and methods for processing phase maps acquired using interferometer wafer geometry tools in order to provide useful pattern structure information of patterned wafers. More specifically, instead of performing phase unwrapping first and then analyze the unwrapped data in a height domain, systems and methods in accordance with the present disclosure operate in a curvature domain without having to perform any phase unwrapping. This provides at least two advantages: 1) phase unwrapping errors are effectively eliminated, and 2) since a lot of important pattern structure information of patterned wafers, such as the pattern structure step height, pattern structure step profile, trench positions, and trench depth, are more identifiable in a curvature map than in a height map, a more accurate wafer structure uniformity monitoring is provided. Furthermore, if a height map is still needed, a curvature map can be efficiently processed to produce one.

This portion of the description will first describe the relationships between surface profile, phase slope and phase curvature maps. Phase curvature, which may also be referred to as the slope of the phase slope, has been investigated to overcome the aforementioned shortcomings effectively, without requiring dense data sampling and more expensive data processing. FIG. 3D depicts the phase curvature derived based on the phase slope shown in FIG. 3C. It is important to note that the phase curvature (FIG. 3D) is obtained without first unwrapping the phase slope (FIG. 3C). Phase unwrapping errors are effectively eliminated in this manner.

It is also important to note that the curvature map, FIG. 3D, can be utilized to reconstruct an unwrapped phase slope if needed. For instance, the curvature map can be calculated first to remove the large phase slope jumps and make the magnitudes of the pattern components uniform. The phase slope can then be calculated by taking the integral of the curvature, resulting in the unwrapped phase slope as shown in FIG. 3E. Furthermore, a height map (i.e., wafer surface profile), as shown in FIG. 3F, can be reconstructed from the unwrapped phase slope.

Figure 4:
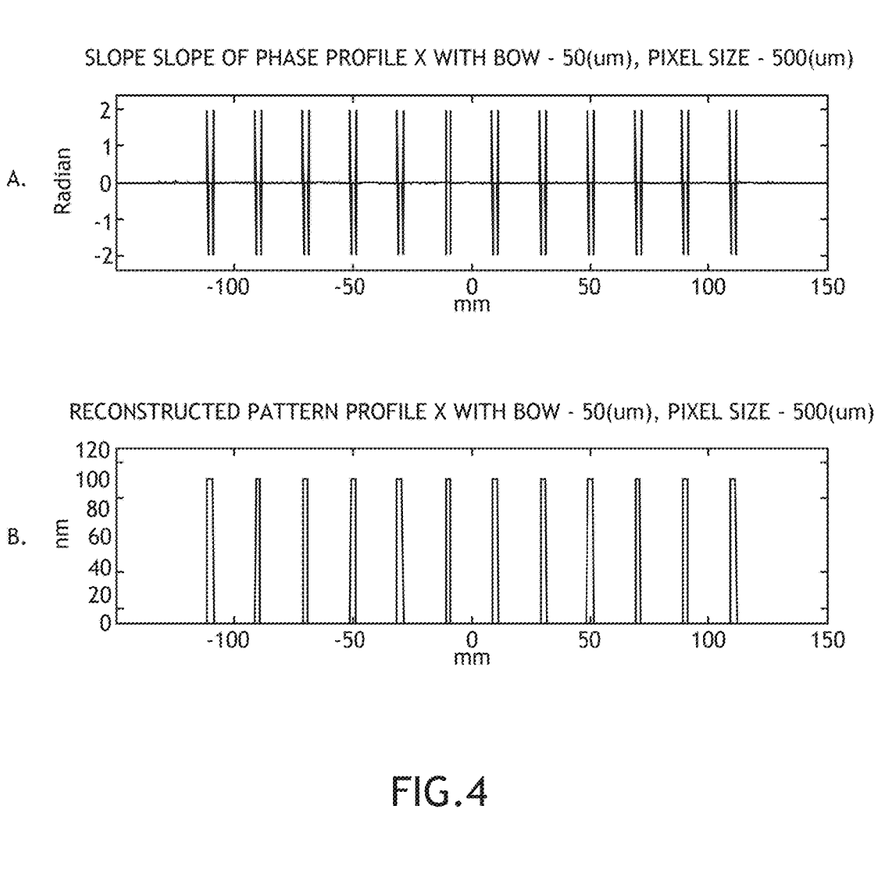
FIG. 4 is an illustration depicting a reconstructed pattern profile from a phase curvature profile.

FIG. 4 is another illustration depicting a reconstructed pattern profile from a phase curvature profile. More specifically, FIG. 4A corresponds to FIG. 3D in that they are both phase curvature profiles of a patterned wafer. However, different from the reconstruction process described in FIG. 3, wherein large phase slope jumps were removed for the purpose of reconstructing the wafer surface without the pattern components, the reconstruction process shown in FIG. 4 is intended to reconstruct a height map of the pattern components themselves. More specifically, the height map (FIG. 4B) of the pattern components can be calculated from the phase curvature profile (FIG. 4A) directly by integration. That is, pattern structure information of a patterned wafer is identifiable in a curvature map, and it is clear that both the phase curvature and the reconstructed pattern height profiles can be used to perform the accurate pattern uniformity measurement and process monitoring. It has been observed that, due to the removal of low frequency wafer shape components in the curvature calculation, the curvature domain pattern uniformity monitoring can achieve higher sensitivity in detecting the pattern variations than in the surface height domain.

To reiterate, the phase curvature map in accordance with the present disclosure can be generated directly from the phase slope acquired using an interferometer wafer geometry tool without phase unwrapping. In addition, pattern structure information of a patterned wafer can be accurately identified utilizing the phase curvature map without needing to generate a height map. Identified pattern structures can also be filtered out of the phase curvature map, and the resulting filtered phase curvature map can be utilized to generate unwrapped phase slope map if it is needed. Furthermore, the unwrapped phase slope map generated in this manner can be utilized to accurately reconstruct a wafer surface profile (which may be referred to as a pseudo-bare wafer surface because the actual wafer measured by the interferometer tool can be patterned).

The advantages provided by the phase curvature map in accordance with the present disclosure can be used to achieve several important benefits for the pattern wafer geometry. For instance, phase curvature processing can be used to obtain the profiles of wafer surfaces with large shape variation by using much lower sampling rate. This will avoid using the dense video frame sampling and subsequent larger data volume in data processing. Phase curvature can also be used to obtain wafer surface curvature directly in the selected wafer orientations, without global two-dimensional phase unwrapping. These pattern curvature values can be used to perform the pattern uniformity monitoring in the curvature domain directly. Additionally, phase curvature can be integrated in the detected pattern component regions to obtain the pattern component height/depth information in any selected orientation. This feature is very useful for pattern uniformity monitoring in the height domain as well.

While the description above illustrates the relationships between surface profile, phase slope and phase curvature maps, it is contemplated that specific calculation processes to obtain the phase curvature maps may vary without departing from the spirit and scope of the present disclosure. The following portion of the description describes calculation processes utilized in one embodiment in accordance with the present disclosure.

Mathematically, for the phase curvature calculation, two phase slopes in X and Y directions are first calculated as follows:

$$PhaseSlope_x(x, y) = \frac{\partial}{\partial x} Phase(x, y)$$

$$PhaseSlope_y(x, y) = \frac{\partial}{\partial y} Phase(x, y)$$

Subsequently, three phase curvature components are calculated as follow:

$$PhaseCurvature_{xx}(x, y) = \frac{\partial}{\partial x} PhaseSlope_x(x, y)$$

$$PhaseCurvature_{yy}(x, y) = \frac{\partial}{\partial y} PhaseSlope_y(x, y)$$

-continued $$PhaseCurvature_{xy}(x, y) = \frac{\partial}{\partial y} PhaseSlope_x(x, y)$$

wherein all these slope and curvatures are calculated using the discrete difference and then modulo $2\pi$ operations in the image pixel positions (x, y).

As illustrated in the equations above, it is contemplated that phase curvature can be calculated along an x-axis, a y-axis, or both, depending on the area of interest and/or the type of analysis to be performed. It is also contemplated that the calculation of the phase curvature can be performed in the any orientation $\theta$ across the wafer center. It can be carried out as follows:

$$PhaseCurvature_{rr}(r, \theta) = \frac{\partial^2}{\partial r^2} Phase(r, \theta)$$

and other one-dimensional phase curvature on the wafer surface can be similarly calculated along the specified straight line to obtain the wafer surface curvature profile along the line. It is noted that since the phase map is wrapped, when the pixel positions are not on the specified straight line, nearest-neighbor interpolation has to be used to obtain the required phase pixel values in this case.

As previously mentioned, the obtained phase curvature maps can be utilized in various pattern wafer monitoring or inspection applications and the like. The following portion of the description describes several exemplary embodiments of such applications.

Figure 5:
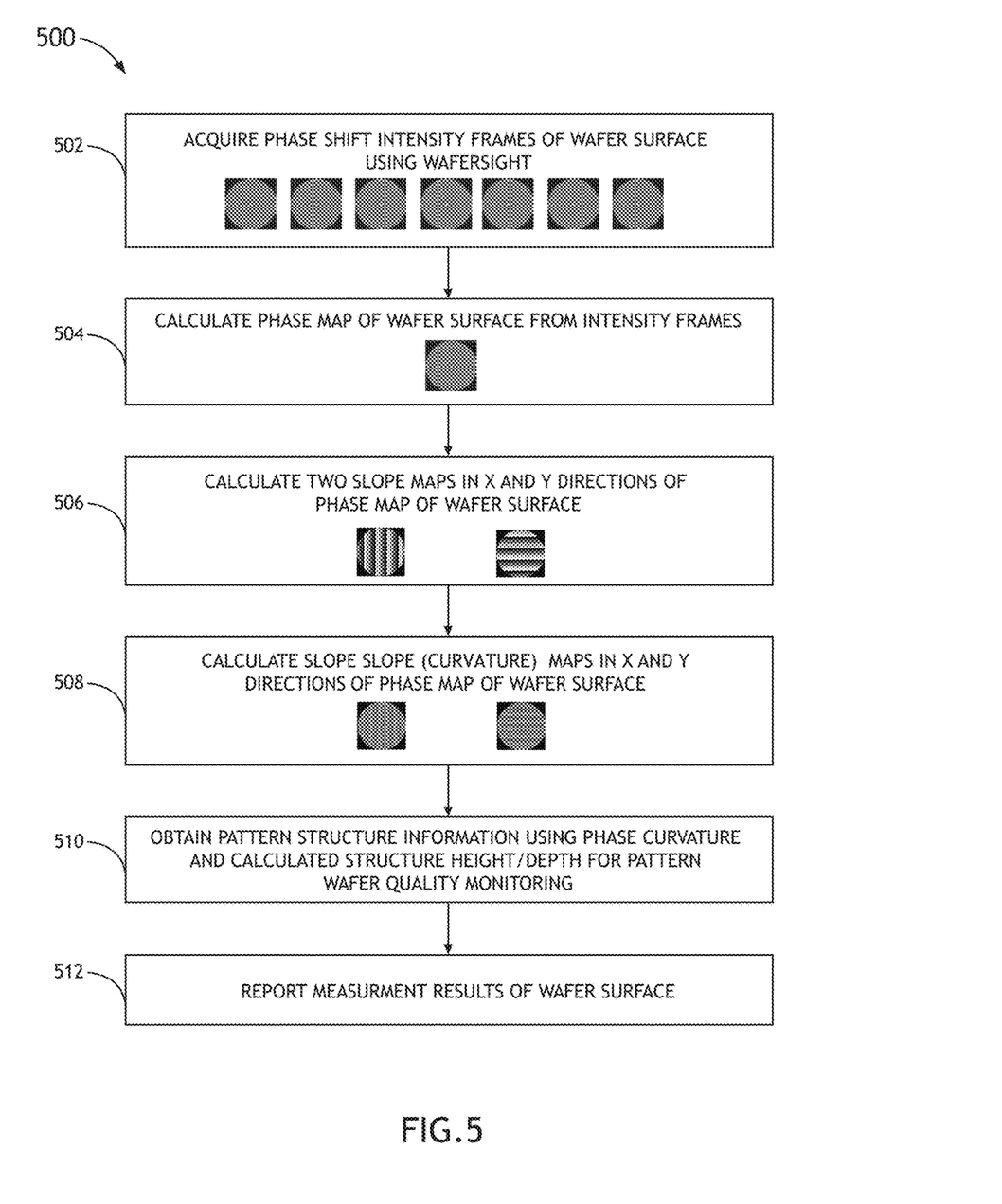
FIG. 5 is a flow diagram depicting a structure uniformity measurement and monitoring method.

Referring to FIG. 5, a flow diagram depicting a structure uniformity measurement and monitoring method 500 is shown. A plurality of phase shift intensity frames of a given wafer can be acquired using an interferometer tool in step 502, and the phase map of the wafer surface can be calculated from these intensity frames in step 504. Subsequently, phase slope maps in the X direction, the Y direction, or both, can be calculated based on the phase map of the wafer in step 506.

Without having to unwrapping the phase slope maps, phase curvature maps in the X direction, the Y direction, or both, are calculated in step 508 based on their corresponding phase slope maps. Utilizing these phase curvature maps, pattern structure information can be obtained and structure height/depth information can be calculated in step 510, as previously described. The calculated measurement results of this particular wafer can be reported and analyzed in step 512. For instance, the calculated pattern information can be used in a die-to-die or a wafer-to-wafer comparison process to monitor process induced pattern structure variations.

Figure 6:
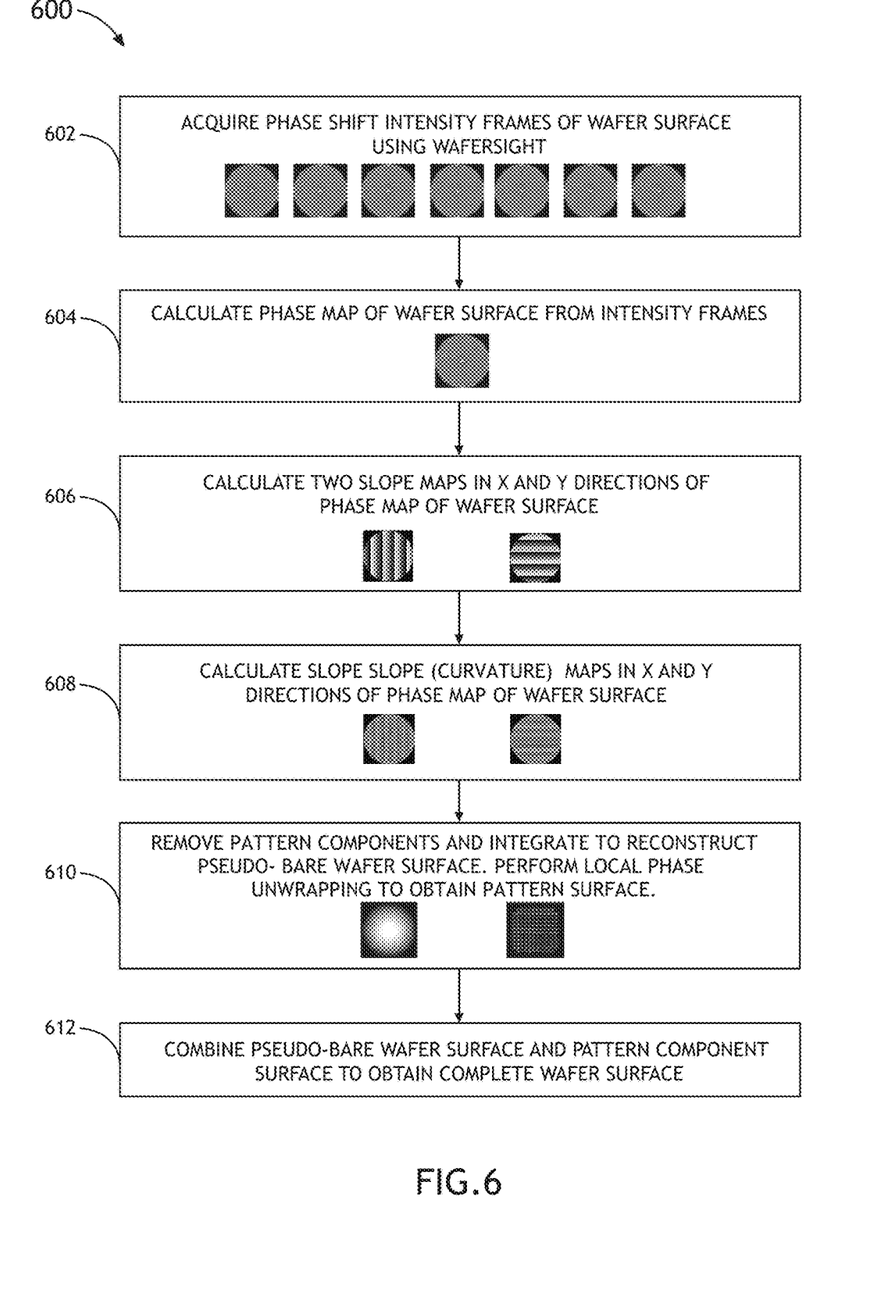
FIG. 6 is a flow diagram depicting a wafer surface reconstruction method.

FIG. 6 shows another useful application utilizing phase curvature maps. More specifically, a flow diagram depicting a wafer surface reconstruction method 600 is shown. Steps 602 through 608 are carried out in a similar manner as steps 502 through 508 described above. Subsequently, the phase curvature maps can be processed to identify the pattern components using the technique previously described. The phase curvature maps can then be filtered to obtain both accurate pseudo-bare wafer surface and the pattern components, as indicated in step 610. It is noted that the pseudo-bare wafer surface can be reconstructed using the filtered curvature maps where the high frequency pattern components and sharp shape transitions have been effectively suppressed and thus more accurate shape surface can be reconstructed. It is also noted that local phase unwrapping techniques as disclosed in U.S. patent application Ser. No. 14/246,895, entitled "Systems and Methods for Wafer Surface Feature Detection and Quantification", the disclosure of which is incorporated herein by reference in its entirety, may also be utilized to help obtaining the pattern components in conjunction with the processes described in the present disclosure. The pseudo-bare wafer surface and the pattern components can also be combined in step 612 to form a complete wafer surface, which may then be provided to downstream applications that are shape and thickness based.

Figure 7:
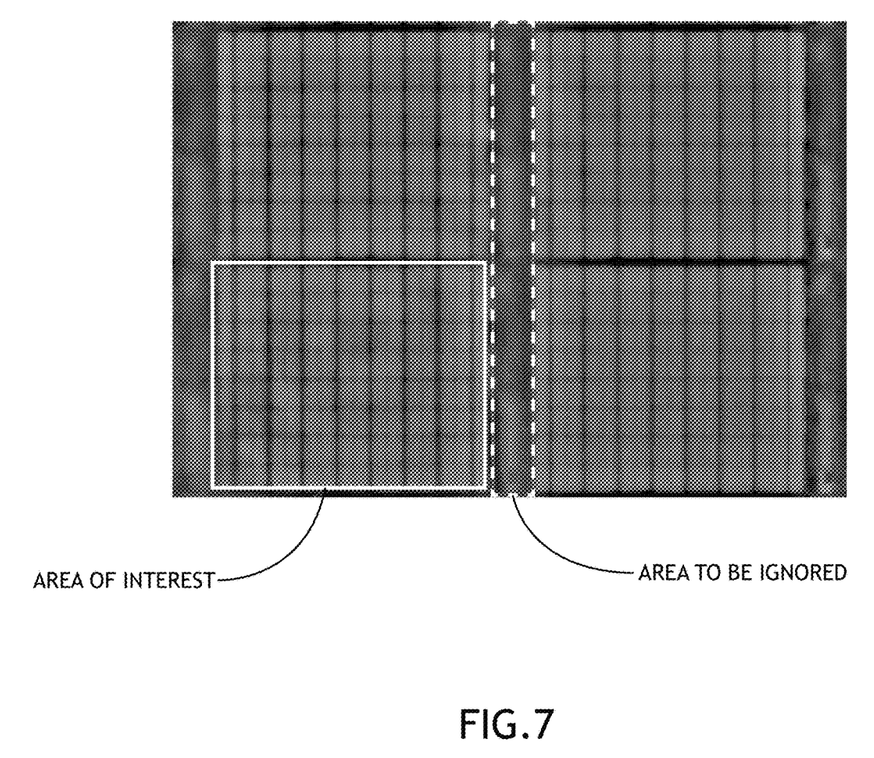
FIG. 7 is an illustration depicting an area of interest and an area that can be ignored defined based on a phase curvature map.

It is contemplated that phase curvature maps can be useful for various other purposes and applications not specifically described here. For instance, as illustrated in FIG. 7, phase curvature can be used to identify chip structural boundaries, which in turn can help defining areas of interest and the areas that can be ignored for analysis purposes. In this manner, only data inside of an area of interest may be used to calculate surface metrics to provide relevant information about the chip structures. It is understood that phase curvature maps can be used for various other purposes and applications without departing from the spirit and scope of the present disclosure.

Figure 8:
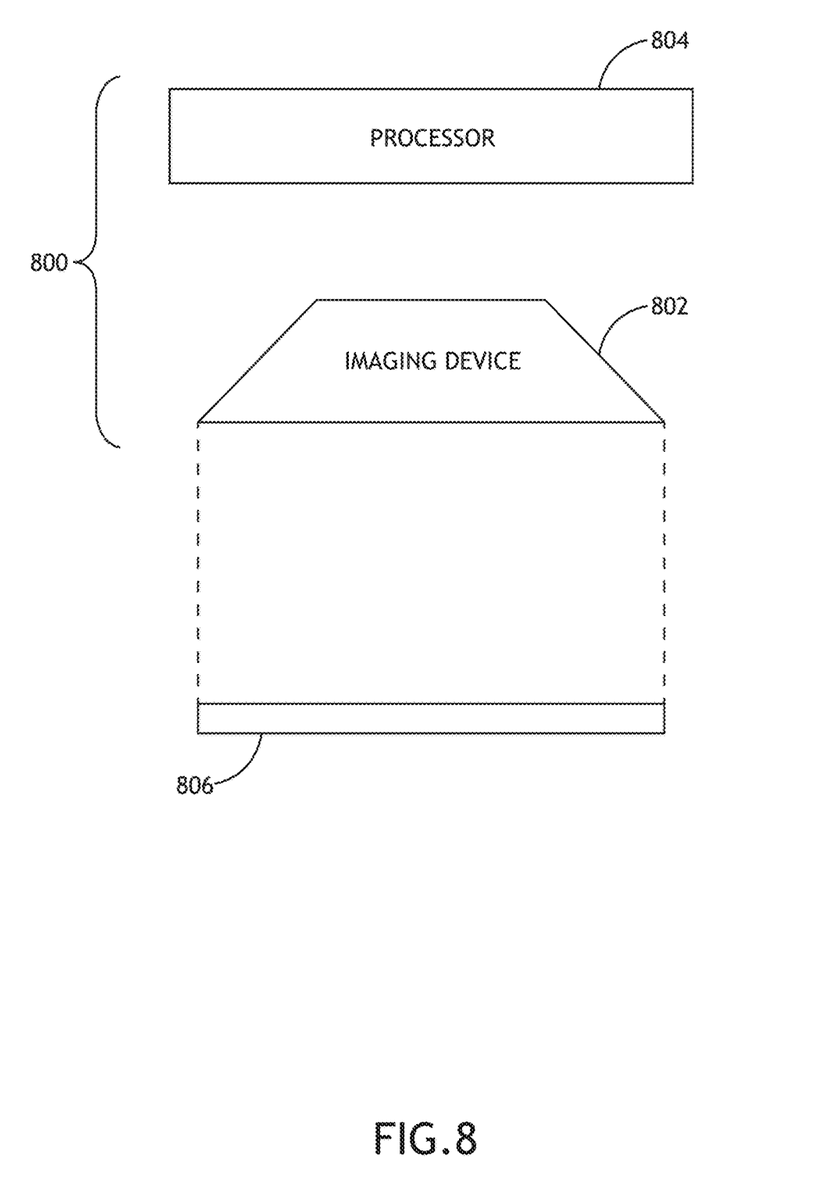
FIG. 8 is a block diagram depicting an interferometer system.

Referring now to FIG. 8, a block diagram depicting an interferometer system 800 capable of performing the various processes described above is shown. The interferometer system 800 may include one or more imaging devices (e.g., a camera, a scanner, a microscope or the like) 802 configured for acquiring phase shift intensity frames of a given wafer 806. It is contemplated that the imaging device 802 may be similar to the ones utilized in conventional interferometer systems; however, higher resolution and/or higher density imaging devices may also be utilized to reduce the sampling error in the high slope wafer surfaces and obtain higher feature spatial resolution.

Data acquired by the imaging device 802 is then provided to a processor 804 configured for processing the acquired data. The processor 804 may be implemented utilizing any standalone or embedded computing device (e.g., a computer, a processing unit/circuitry or the like). Upon receiving the data from the imaging device 802, the processor 804 may process the received data and calculate the phase curvature maps and use the phase curvature maps for various purposes as described above.

It is understood that while the examples above referred to patterned wafers as being particularly challenging for existing wafer measurement tools to handle, the systems and methods in accordance with the present disclosure are not limited to processing patterned wafers. The systems and methods in accordance with the present disclosure are applicable to other types of polished plates as well without departing from the spirit and scope of the present disclosure. The term wafer used in the present disclosure may include a thin slice of semiconductor material used in the fabrication of integrated circuits and other devices, as well as other thin polished plates such as magnetic disc substrates, gauge blocks and the like.

The methods disclosed may be implemented as sets of instructions, through a single processing device, and/or through multiple processing devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. A method, comprising:
acquiring a plurality of intensity frames of a surface of a wafer via an imaging device of an interferometer;
transmitting the plurality of intensity frames of the surface of the wafer from the imaging device of the interferometer to a processor via a communication link;
extracting a phase map of the surface of the wafer based on the plurality of intensity frames;
calculating a phase slope map of the surface of the wafer in a selected direction of the phase map of the surface of the wafer;
calculating a phase curvature map of the surface of the wafer in the selected direction of the phase map of the surface of the wafer, wherein the phase curvature map is calculated from the phase slope map without unwrapping the phase slope map, the phase curvature map representing slope of the phase slope map;
obtaining pattern structure information present on the surface of the wafer based on the phase curvature map;
providing the pattern structure information to the interferometer; and
configuring the interferometer based on the provided pattern structure information to reduce at least one of a data sampling rate or a data sampling density during one or more metrology processes.

2. The method of claim 1, wherein the selected direction is at least one of: an x-direction and a y-direction.

3. The method of claim 1, further comprising:
calculating pattern structure height information based on the phase curvature map.

4. The method of claim 3, further comprising:
monitoring pattern structure uniformity based on the pattern structure height information.

5. The method of claim 1, further comprising:
filtering the pattern structure information from the phase curvature map; and
calculating a pseudo-bare wafer surface based on the filtered phase curvature map.

6. The method of claim 1, wherein the pattern structure information includes at least one of step height, profile, trench position, or depth.

7. A method, comprising:
acquiring a plurality of intensity frames of a surface of a wafer via an imaging device of an interferometer;
transmitting the plurality of intensity frames of the surface of the wafer from the imaging device of the interferometer to a processor via a communication link;
extracting a phase map of the surface of the wafer based on the plurality of intensity;
calculating a phase slope map of the surface of the wafer in a selected direction of the phase map of the surface of the wafer;
calculating a phase curvature map of the surface of the wafer in the selected direction of the phase map of the surface of the wafer, wherein the phase curvature map is calculated from the phase slope map without unwrapping the phase slope map, the phase curvature map representing slope of the phase slope map;

obtaining pattern structure information present on the surface of the wafer based on the phase curvature map;

calculating pattern structure height information based on the phase curvature map;

providing the pattern structure height information to the interferometer; and configuring the interferometer based on the provided pattern structure height information to reduce at least one of a data sampling rate or a data sampling density during one or more metrology processes.

8. The method of claim 7, wherein the selected direction is at least one of: an x-direction and a y-direction.

9. The method of claim 7, wherein the pattern structure information includes at least one of step height, profile, trench position, or depth.

10. A method, comprising:

acquiring a plurality of intensity frames of a surface of a wafer via an imaging device of an interferometer;

transmitting the plurality of intensity frames of the surface of the wafer from the imaging device of the interferometer to a processor via a communication link;

extracting a phase map of the surface of the wafer based on the plurality of intensity frames;

calculating a phase slope map of the surface of the wafer in a selected direction of the phase map of the surface of the wafer;

calculating a phase curvature map of the surface of the wafer in the selected direction of the phase map of the surface of the wafer, wherein the phase curvature map is calculated from the phase slope map without unwrapping the phase slope map, the phase curvature map representing slope of the phase slope map;

obtaining pattern structure information present on the surface of the wafer based on the phase curvature map;

filtering the pattern structure information from the phase curvature map; and calculating a pseudo-bare wafer surface based on the filtered phase curvature map;

providing information corresponding to the pseudo-bare wafer surface to the interferometer; and configuring the interferometer based on the provided information corresponding to the pseudo-bare wafer surface to reduce at least one of a data sampling rate or a data sampling density during one or more metrology processes.

11. The method of claim 10, wherein the selected direction includes both an x-direction and a y-direction.

12. The method of claim 10, further comprising:

combining the pattern structure information and the pseudo-bare wafer surface to obtain a reconstructed complete wafer surface;

providing information corresponding to the reconstructed complete wafer surface to the interferometer; and configuring the interferometer based on the provided information corresponding to the reconstructed complete wafer surface to reduce at least one of a data sampling rate or a data sampling density during one or more metrology processes.

13. The method of claim 10, wherein the pattern structure information includes at least one of step height, profile, trench position, or depth.

14. A system, comprising:

an interferometer comprising at least an imaging device, the imaging device configured to acquire a plurality of intensity frames of a surface of a wafer, wherein the interferometer is configured to communicatively couple to a processor via a communication link; and a processor communicatively coupled to the interferometer via a communication link, the processor configured to:

receive the plurality of intensity frames of the surface of the wafer from the interferometer via the communication link;

extract a phase map of the surface of the wafer based on the plurality of intensity frames;

calculate a phase slope map of the surface of the wafer in a selected direction of the phase map of the surface of the wafer;

calculate a phase curvature map of the surface of the wafer in the selected direction of the phase map of the surface of the wafer, wherein the phase curvature map is calculated from the phase slope map without unwrapping the phase slope map, the phase curvature map representing slope of the phase slope map;

obtain pattern structure information present on the surface of the wafer based on the phase curvature map;

provide the pattern structure information to the interferometer; and configure the interferometer based on the provided pattern structure information to reduce at least one of a data sampling rate or a data sampling density during one or more metrology processes.

15. The system of claim 14, wherein the selected direction is at least one of: an x-direction and a y-direction.

16. The system of claim 14, wherein the processor is further configured to:

calculate pattern structure height information based on the phase curvature map.

17. The system of claim 16, wherein the processor is further configured to:

provide the pattern structure height information to the interferometer; and configure the interferometer based on the provided pattern structure height information to reduce at least one of a data sampling rate or a data sampling density during one or more metrology processes.

18. The system of claim 14, wherein the processor is further configured to:

filter the pattern structure information from the phase curvature map; and calculate a pseudo-bare wafer surface based on the filtered phase curvature map.

19. The system of claim 18, wherein the processor is further configured to:

provide information related to the pseudo-bare wafer surface to the interferometer; and configuring the interferometer based on the provided information related to the pseudo-bare wafer surface to reduce at least one of a data sampling rate or a data sampling density during one or more metrology processes.

20. The system of claim 18, wherein the processor is further configured to:

combine the pattern structure information and the pseudo-bare wafer surface to obtain a reconstructed complete wafer surface.

21. The system of claim 20, wherein the processor is further configured to:

provide information corresponding to the reconstructed complete wafer surface to the interferometer; and configure the interferometer based on the provided information corresponding to the reconstructed complete wafer surface to reduce at least one of a data sampling rate or a data sampling density during one or more metrology processes.

22. The system of claim 14, wherein the pattern structure information includes at least one of step height, profile, trench position, or depth.

\* \* \* \* \*